United States Patent [19]

Snyder

[11] Patent Number: 5,470,123
[45] Date of Patent: Nov. 28, 1995

[54] VISOR BRACKET

[75] Inventor: Ronald P. Snyder, Holland, Mich.

[73] Assignee: Prince Corporation, Holland, Mich.

[21] Appl. No.: 386,730

[22] Filed: Feb. 10, 1995

[51] Int. Cl.⁶ ...................................................... B60J 3/00
[52] U.S. Cl. ...................... 296/97.9; 296/97.5; 248/316.7
[58] Field of Search ................... 296/97.9, 97.11–97.13, 296/97.5; 248/231.8, 316.7, 314

[56] References Cited

U.S. PATENT DOCUMENTS

| | | | |
|---|---|---|---|
| 2,456,484 | 12/1948 | Bell | 296/97.9 |
| 2,561,923 | 7/1951 | Harmon | 211/69.6 |
| 3,228,722 | 1/1966 | Clare | 296/97.13 |
| 3,282,624 | 11/1966 | Doerfling | 296/97.12 |
| 3,399,923 | 9/1968 | Bornefeld et al. | 296/97.13 |
| 3,433,525 | 3/1969 | Augunas | |
| 3,463,435 | 8/1969 | McGrew, Jr. | 296/97.1 |
| 3,825,296 | 7/1974 | Peterson | 296/97.13 |
| 4,451,076 | 5/1984 | Viertel et al. | |
| 4,921,300 | 5/1990 | Lawassani et al. | 296/97.11 |
| 4,941,704 | 7/1990 | Baumert et al. | 296/97.11 |
| 5,004,288 | 4/1991 | Viertel et al. | 296/97.11 |
| 5,071,186 | 12/1991 | Hemmeke et al. | 296/97.9 |
| 5,242,204 | 9/1993 | Kitterman et al. | 296/97.9 |
| 5,280,988 | 1/1994 | Gute | 296/97.9 |
| 5,358,299 | 10/1994 | Seto | 296/97.9 |

FOREIGN PATENT DOCUMENTS

| | | |
|---|---|---|
| 2803731 | 8/1979 | Germany . |
| 3536471 | 4/1987 | Germany . |
| 3713425 | 11/1988 | Germany . |
| 0026323 | 2/1984 | Japan . |
| 404110224 | 4/1992 | Japan . |
| 405096953 | 4/1993 | Japan . |

Primary Examiner—Dennis H. Pedder
Attorney, Agent, or Firm—Price, Heneveld, Cooper, DeWitt & Litton

[57] ABSTRACT

A visor mounting bracket defines a channel opening forwardly and rearwardly such that a visor end post can be inserted and held within the channel from either direction. In a preferred embodiment of the invention the bracket is made of a resilient polymeric material. Also in a preferred embodiment, the channel includes a detent for releasably holding the visor end post within the visor bracket. In one embodiment of the invention, the visor bracket additionally includes a socket for receiving an auxiliary visor pivot rod.

23 Claims, 1 Drawing Sheet

VISOR BRACKET

BACKGROUND OF THE INVENTION

The present invention relates to vehicle visors and particularly to a mounting clip for supporting an end of a visor to the vehicle roof.

Many automotive visors now include accessories such as vanity mirrors, illuminated vanity mirror packages, or other accessories which add a significant amount of weight to the vehicle visor. Also, in modem vehicles in which the windshields are becoming increasingly larger, the width and height of the visor panels has increased to provide adequate sunblocking protection for the windshield area. Traditionally, such visors have included an end support rod or post which is a cylindrical member which extends from the free end of the visor, that is the end remote from the visor's conventional pivot rod mounting to the vehicle roof. Such end post is typically received in a bracket which typically is mounted either adjacent the rearview mirror of the vehicle or in some cases has been integrated into a center console for the vehicle. Such end post receiving mounting brackets typically have an opening facing rearwardly in the vehicle such that the visor which is supported therein can be removed from clip by drawing the visor rearwardly away from the mounting bracket releasing the end post and allowing the visor to be pivoted to a side window sunblocking position.

With the increasing slanting of vehicle windshields to conform to the aerodynamic design of modem vehicles, the upper edge of the vehicle windshield is moving rearwardly in the vehicle and somewhat closer to the occupants head. The ease by which one can remove a visor from such an end post support bracket has, as a result, become more difficult and arduous in view of the nearly overhead positioning of such a bracket.

SUMMARY OF THE PRESENT INVENTION

The visor mounting bracket of the present invention overcomes the problem existent with the traditional brackets by providing an end post visor receiving bracket in which a visor end post can be withdrawn from the bracket either in a rearward or forward direction. This greatly facilitates removal of the visor from the bracket to allow the visor to be pivoted to the side window position. It accomplishes this objective by providing a body defining a channel which opens from opposite sides in the forward and aft directions for insertion and removal of a visor end post forwardly or rearwardly in the vehicle. In a preferred embodiment of the invention the visor bracket includes a detent formed within the channel for releasably holding the visor end post within the channel. In one preferred embodiment of the invention, the bracket may additionally include a socket for receiving an auxiliary visor pivot rod.

With such a system therefore, an improved visor end post mounting bracket is provided by which a visor can be stored in the front windshield position and removed by moving the visor either forwardly to release the visor and then pivot to the side window or move rearwardly and pivoted directly to the side window, whichever is more convenient for the user of the system. Storage of the visor is equally facilitated by the bracket. The bracket accommodates multiple visor systems popular in many vehicles and provides an improved system for releasably holding a visor end post. These and other features, objects and advantages of the present invention will become apparent upon reading the following description thereof together with reference to the accompanying drawings in which:

DETAILED DESCRIPTION OF THE PREFERRED EMBODIMENT

Figure 1:
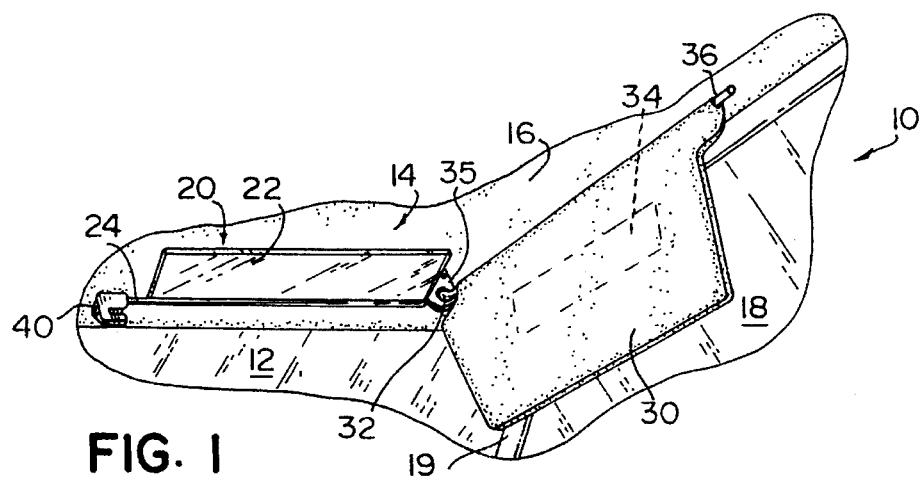
FIG. 1 is a fragmentary perspective view of a vehicle embodying the visor bracket of the present invention.

Referring initially to FIG. 1 there is a shown a vehicle 10 such as an automobile having a front windshield 12, a roof 14 which may include an integral headliner assembly 16 therein which includes a multiple visor assembly 20 of the type, for example, disclosed in U.S. Pat. No. 5,071,186. The vehicle also includes a side window 18 with an A-pillar extending between the windshield 12 and the side window 18. The visor system 20 includes a first visor panel 22 which is pivoted between a raised stored position above the vehicle windshield 12 adjacent the headliner 16 as shown in FIG. 1 and can be pivoted downwardly to a front windshield sunblocking position by means of a pivot rod 24 having one end extending into a socket of the visor bracket 40 of the present invention and an opposite end extending into a pivot rod mounting bracket 35. Pivot rod 24 includes suitable torque fittings of for holding visor panel 22 in a stored position as illustrated or selected use positions. The pivot rod 24 may have a frictional fit within the visor bracket 40 and mounting bracket 35 or have a fixed pivot rod 24 with a frictional torque interface between the visor panel 22 and the pivot rod as is conventional.

Visor system 20 further includes a second visor panel 30 having an elbow pivot rod 32 at one end which allows the visor panel 30 to be moved from a raised stored position adjacent and overlying visor panel 22 to a lowered side window rotated position as illustrated in FIG. 1 in a conventional manner. The pivot bracket 35 can be of a construction described in U.S. Pat. No. 5,242,204 to accommodate the elbow pivot rod 32 as well as pivot rod 24 associated with visor panel 22.

Visor 30 preferably includes an illuminated vanity mirror assembly 34 (shown in phantom form in FIG. 1) on a side opposite that shown in FIG. 1 which may include a cover and illumination means for providing an illuminated vanity mirror package for use by the vehicle occupant. In the installation shown in FIG. 1, the vehicle passenger visor installation is shown. Visor 30 also includes a cylindrical end post 36 extending outwardly from an end of the visor panel remote from elbow pivot rod 32 and which is releasably held by the improved visor bracket 40 embodying the present invention and now described in connection with FIGS. 2–4.

The visor bracket 40 is integrally molded of a suitable polymeric material such as polycarbonate, ABS, or the like and includes a body 42 which is attached to the underlying sheet metal roof 14 of the vehicle by means of a threaded fastener such as a fastening screw 44 (FIGS. 3 and 4) which extends through the body 42 in a central area thereof for attaching the bracket as seen in FIG. 1 to the vehicle. Fastener 44 can be a snapping clip or other suitable fastener in use for attaching vehicle accessories either directly to the sheet metal roof of the vehicle or to an integral headliner of the vehicle.

Figure 2:
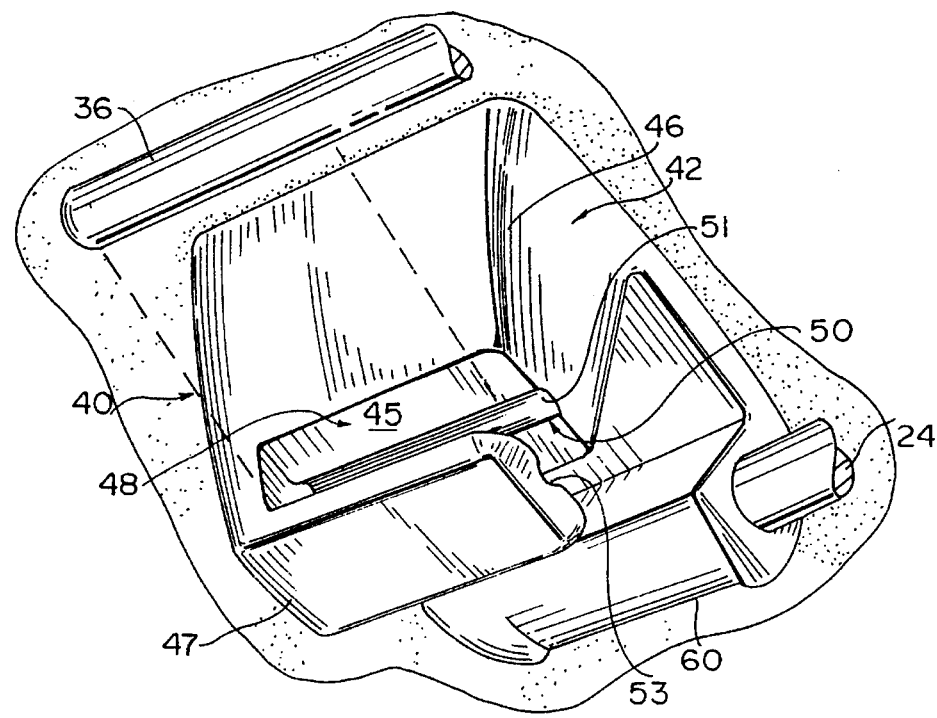
FIG. 2 is a greatly enlarged fragmentary perspective view of the visor bracket of the present invention shown in FIG. 1.
Figure 3:
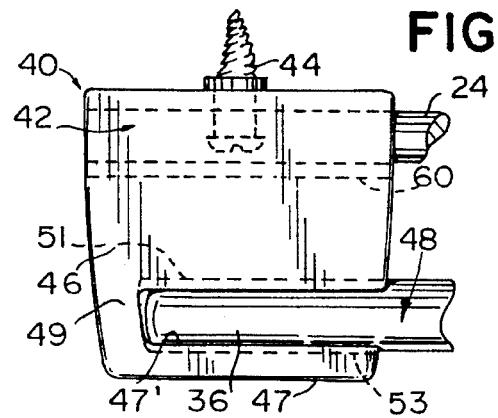
FIG. 3 is a front elevational view of the visor bracket shown in FIG. 2 shown with a visor end post mounted therein.
Figure 4:
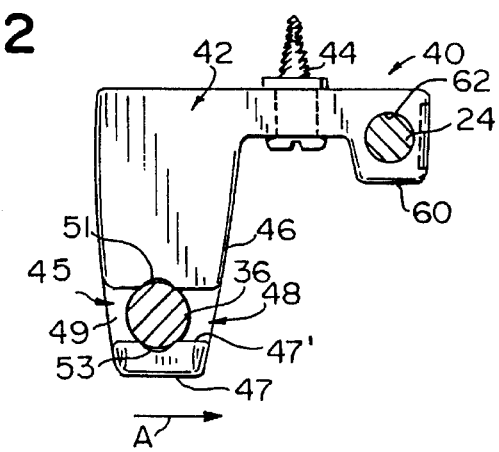
FIG. 4 is a right side elevational view partly in cross-section of the visor bracket and visor end post.

Bracket 40 includes a downwardly extending leg 46 which defines an open channel 48 which as best seen in FIGS. 1, 2 and 4 opens both from the front, right side, and rear of the mounting bracket 40 such that the visor end post can be inserted and removed from the visor bracket in either a forwardly extending direction indicated by Arrow A in FIG. 4 or in a rearwardly extending direction in a direction opposite Arrow A in FIG. 4. Channel 48 is defined in the preferred embodiment of the invention by a generally L-shaped end of leg 46 having a lower leg 47 joined to the downwardly extending leg 46 by leg section 49.

Channel 48 in a preferred embodiment integrally includes detent means which in the preferred embodiment comprises semi-cylindrical recesses 51 and 53 formed in opposed facing surfaces of the channel 48 namely, lower surface 45 and upper surface 47' of leg 47. The vertical space between surfaces 45 and 47' is selected such that it is slightly smaller than the outer diameter of the cylindrical end post 36 whereas the diameter of the cylinder defined by semi-cylindrical sections 51 and 53 is generally the same as the diameter of post 36 such that the post snaps into and is releasably held within the detent means 50 (FIG. 2) defined by recesses 51 and 53. The use of resilient polymeric material for body 42 permits leg 47 to deflect sufficiently to allow the easy insertion and removal of the cylindrical post 36 whose curved edges will easily deflect leg 47 for such operation.

In the preferred embodiment of the invention, the visor bracket 40 additionally integrally includes, as best seen in FIGS. 2 and 4, an auxiliary pivot rod receiving member 60 on a side of fastener 44 remote from leg 46. Member 60 has a cylindrical socket 62 for receiving the end of pivot rod 24. The lower surface of member 60, as best seen in FIG. 4, is spaced sufficiently close to the vehicle roof to provide clearance for end post 36 of visor 30 to be moved forwardly in a direction indicated by Arrow A in FIG. 4 without interference with the auxiliary visor pivot rod 24 or visor 22.

Although the visor bracket 40 of the present invention defines a generally U-shaped channel 48 opening forwardly and rearwardly in the vehicle, other channel configurations such as C-shaped or the like can also be employed as long as they provide an open socket for receiving the end post of the visor for insertion and removal in either a forwardly or rearwardly facing direction. Preferably any design includes detent means for releasably holding the visor end post within the visor bracket so defined. These and various other modifications to the preferred embodiment of the invention will become apparent to those skilled in the art without departing from the spirit or scope of the invention as defined by the appended claims.

The embodiments of the invention in which an exclusive property or privilege is claimed are defined as follows.

1. A visor bracket for releasably receiving an end post of a visor comprising:

a body for mounting to a vehicle, said body including a leg extending downwardly and including a channel formed in a side of said leg for receiving an end post of a visor, said channel opening forwardly and rearwardly when said body is installed in a vehicle such that a visor end post can be inserted from either a forward or rearward direction in the vehicle.

2. The visor bracket as defined in claim 1 wherein said channel includes detent means for releasably holding a visor end post.

3. The visor bracket as defined in claim 2 wherein said channel is defined by a generally L-shaped leg extending from said body of said bracket.

4. The visor bracket as defined in claim 3 wherein said detent means comprises semi-cylindrical recesses formed within opposed facing surfaces of said channel.

5. The visor bracket as defined in claim 4 and further including a cylindrical socket for receiving a pivot rod of a second visor.

6. The visor bracket as defined in claim 1 wherein said channel is defined by a deflectable resilient polymeric leg.

7. The visor bracket as defined in claim 6 wherein said visor bracket is integrally molded of a resilient polymeric material.

8. The visor bracket as defined in claim 7 wherein said resilient polymeric material comprises polycarbonate.

9. A visor bracket for releasably receiving an end post of a visor comprising:

a resilient polymeric body including a channel formed in one side thereof for releasably receiving an end post of a visor, said channel opening forwardly and rearwardly when said body is mounted in a vehicle such that a visor end post can be inserted from either a forward or rearward direction.

10. The visor bracket as defined in claim 9 wherein said channel includes detent means for releasably holding a visor end post.

11. The visor bracket as defined in claim 10 wherein said channel is defined by a generally L-shaped leg extending downwardly from said body of said bracket.

12. The visor bracket as defined in claim 11 wherein said detent means comprises semi-cylindrical recesses formed within opposed facing surfaces of said channel.

13. The visor bracket as defined in claim 9 and further including a cylindrical socket for receiving a pivot rod of a second visor.

14. The visor bracket as defined in claim 9 wherein said channel is defined by a deflectable resilient polymeric leg.

15. The visor bracket as defined in claim 6 wherein said visor bracket is integrally molded of said resilient polymeric material.

16. The visor bracket as defined in claim 15 wherein said resilient polymeric material comprises polycarbonate.

17. A visor bracket for a multiple visor system for releasably receiving an end post of one visor of the visor system and receiving a pivot rod of another visor of the visor system, said bracket comprising:

a body including means for securing said body to a vehicle, said body including a channel formed therein for releasably receiving an end post of a visor, said channel opening forwardly and rearwardly when said body is mounted in a vehicle such that a visor end post can be inserted from either a forward or rearward direction.

18. The visor bracket as defined in claim 17 wherein said channel includes a detent for releasably holding a visor end post.

19. The visor bracket as defined in claim 18 wherein said detent comprises semi-cylindrical recesses formed within opposed facing surfaces of said channel.

20. The visor bracket as defined in claim 19 wherein said channel is defined by a resilient L-shaped leg extending downwardly from said body of said bracket.

21. The visor bracket as defined in claim 17 and further including a cylindrical socket for receiving a pivot rod of a second visor.

22. The visor bracket as defined in claim 17 wherein said channel is defined by a deflectable resilient polymeric leg.

23. The visor bracket as defined in claim 17 wherein said visor bracket is integrally molded of a resilient polymeric material.

* * * * *

UNITED STATES PATENT AND TRADEMARK OFFICE
CERTIFICATE OF CORRECTION

PATENT NO.  : 5,470,123
DATED       : November 28, 1995
INVENTOR    : Ronald P. Snyder It is certified that error appears in the above-identified patent and that said Letters Patent is hereby corrected as shown below:

Column 1, line 11;
    "modem" should be --modern--.

Column 1, line 30;
    "modem" should be --modern--.

Column 3, line 3;
    "snapping clip" should be --snap-in clip--.

Signed and Sealed this

Sixteenth Day of April, 1996

*Attest:*

BRUCE LEHMAN

*Attesting Officer*       *Commissioner of Patents and Trademarks*